No. 835,359. PATENTED NOV. 6, 1906.
J. W. KOMINEK.
EXTENSION BRACE BAR.
APPLICATION FILED MAR. 14, 1906.
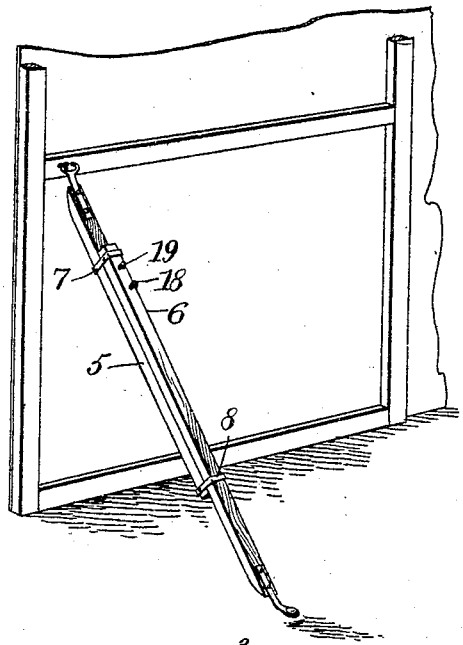
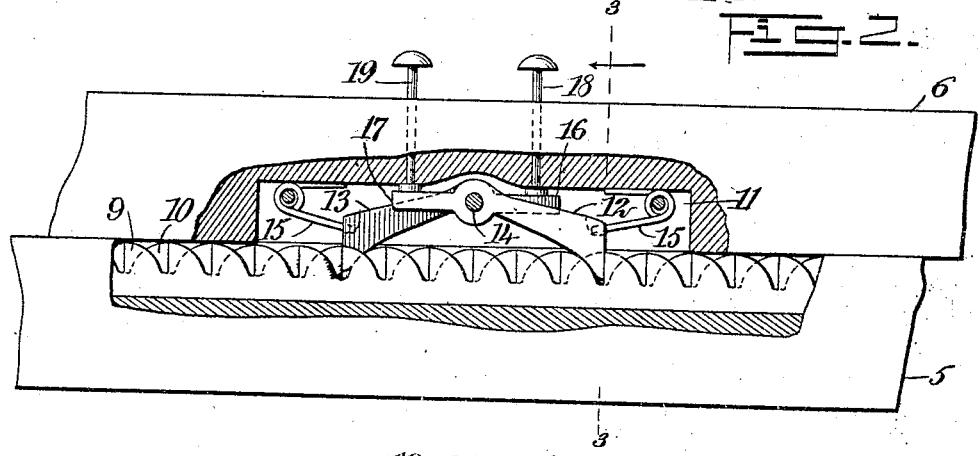
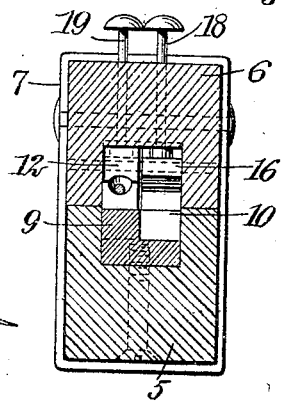
WITNESSES:
INVENTOR
Joseph W. Kominek
BY
ATTORNEYS

UNITED STATES PATENT OFFICE.

JOSEPH W. KOMINEK, OF CEDAR RAPIDS, IOWA.

EXTENSION BRACE-BAR.

No. 835,359.  Specification of Letters Patent.  Patented Nov. 6, 1906.

Application filed March 14, 1906. Serial No. 306,001.

*To all whom it may concern:*

Be it known that I, JOSEPH W. KOMINEK, a citizen of the United States, and a resident of Cedar Rapids, in the county of Linn and State of Iowa, have invented a new and Improved Extension Brace-Bar, of which the following is a full, clear, and exact description.

This invention relates to improvements in brace-bars, particularly adapted for use in supporting theatrical stage-wings or the like, the object being to provide a brace that may be readily adjusted as to length and firmly held when adjusted.

I will describe an extension brace-bar embodying my invention and then point out the novel features in the appended claims.

Reference is to be had to the accompanying drawings, forming a part of this specification, in which similar characters of reference indicate corresponding parts in all the figures.

Figure 1 is a perspective view of an extension brace-bar embodying my invention. Fig. 2 is a sectional detail showing the locking mechanism, and Fig. 3 is a section on the line 3 3 of Fig. 2.

The brace-bar comprises two members or sections 5 6, slidable one upon the other. As here shown, the section 5 slides through a yoke 7, secured to the section 6, while the said section 6 slides through a yoke 8, secured to the section 5. At the ends the sections are provided with suitable devices for securing them to a stage-floor and to the framing of scenery. One of the sections (here indicated as section 5) is provided with a longitudinal channel in which are secured two rack-bars 9 and 10, the teeth of the bars of one rack being extended in an opposite direction to the teeth of the other bar, and the teeth are curved downward from their engaging surfaces. The section 6 has a chamber 11, in which two oppositely-disposed pawls 12 and 13 are arranged, these pawls being mounted to swing on a pivot 14. The pawl 12 is designed for engaging with a tooth of the rack 9, and the pawl 13 is designed for engagement with a tooth of the rack 10, and they are held yieldingly in engagement with the racks by means of springs 15, these springs having one end engaged with the wall of the chamber 11, while the other ends engage in perforations in the ends of the pawls. The pawls 12 and 13 have extensions 16 and 17, which project at the opposite sides of the pivot-pin to that of the engaging portions of the pawls, and these projections are engaged by push-pins 18 and 19, which extend outward through openings in the section or member 6 of the brace-rod.

In the operation of adjusting the rod as to its length by pushing the pin 18 inward the pawl 13 will be moved out of engagement with its rack, and then the section 6 may be moved along the section 5. The pawl 12 will ride over the curved surface of the teeth on the rack 9. To adjust the parts in the opposite direction, the pin 19 is to be forced inward, releasing the pawl 12 from its rack and permitting the pawl 13 to ride over the curved surface of its rack-teeth.

Having thus described my invention, I claim as new and desire to secure by Letters Patent—

1. A brace comprising members having slidable connection, two rack-bars connected to one of the sections, the teeth of one bar being in reverse direction to the teeth of the other bar, and reversely-extended pawls carried by the other member of the brace for engaging with the rack-bars.

2. A brace comprising two members slidable one upon the other, one of said members having a longitudinal channel two rack-bars arranged in said channel, the teeth of one bar being reverse to the teeth of the other bar, the other section of the brace-bar having a chamber, spring-pressed oppositely-extended pawls pivoted in said chamber and outwardly-extended pins for operating said pawls.

In testimony whereof I have signed my name to this specification in the presence of two subscribing witnesses.

JOSEPH W. KOMINEK.

Witnesses:
JOSEPH W. LESINGER,
FRANK J. D. VORAK.